Nov. 22, 1938. J. E. DAVEY 2,137,800
SAW HANDLE AND BLADE
Filed Sept. 4, 1937
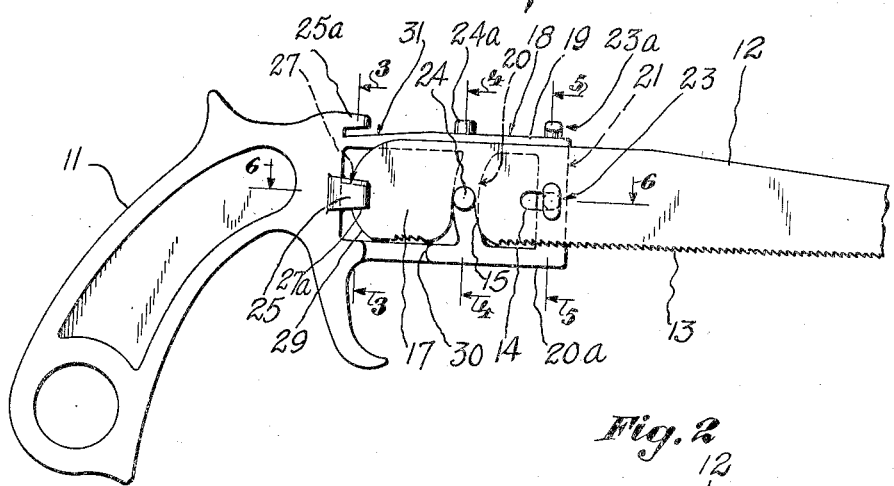
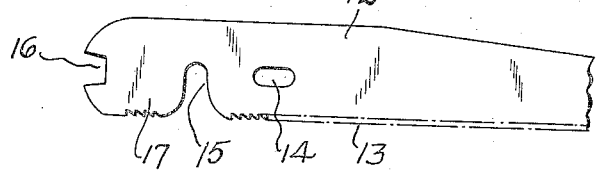
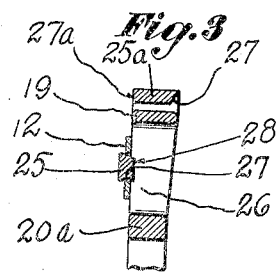
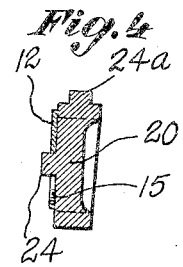
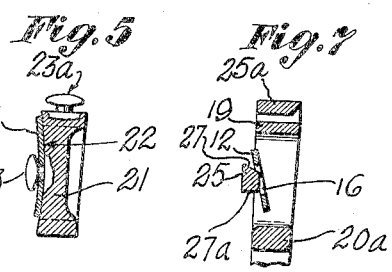
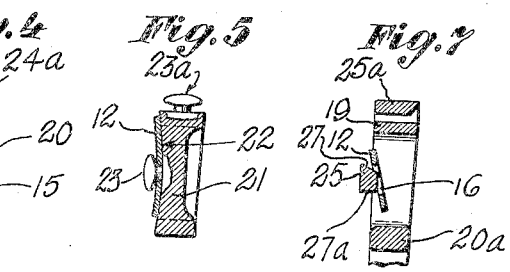
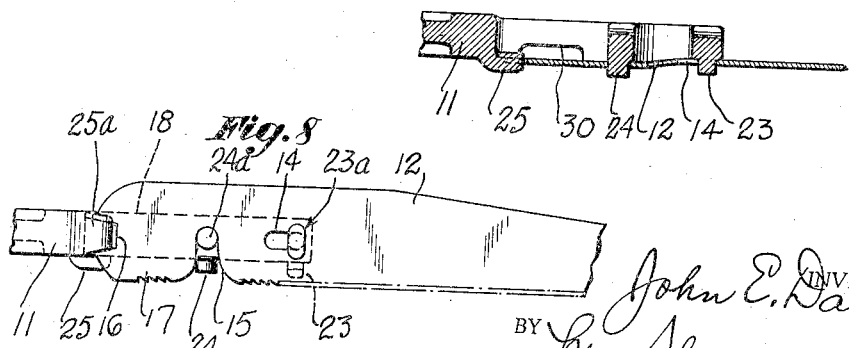
INVENTOR.
John E. Davey
BY Miss Shumacher
ATTORNEY.

Patented Nov. 22, 1938

2,137,800

UNITED STATES PATENT OFFICE 2,137,800

SAW HANDLE AND BLADE

John E. Davey, New York, N. Y., assignor to Rose Gringer, New York, N. Y.

Application September 4, 1937, Serial No. 162,457

8 Claims. (Cl. 145—108)

This invention relates to devices such as tools and has particular reference to tool handles and tools, blades or saws therefor.

One object of the invention is to provide a device of the character described comprising improved means for automatically releasably locking against accidental loosening of a tool which is secured to a handle by a swinging motion.

This invention represents an improvement over my Patent No. 2,017,895 issued October 22nd, 1935, for Saw handles. I have found that while the latter were generally quite satisfactory in use, difficulties would arise due to releasing swinging movement of the saw blade while in actual use. This drawback occurred particularly where the saw was of considerable size, necessitating the application of a good deal of force in the sawing operation. Such accidental releasing movement, generally designated as "buckling" might cause injury to the hand of the operator, and resulted in a loss of time and labor in the use of the tool.

Accordingly, it is an object of the present invention to overcome this difficulty by the use of simple, semi-automatic means, while at the same time assuring that the tool or saw blade shall be rigidly held against lateral and longitudinal movements, as well as against swinging movement.

Another object of the invention is to provide a tool such as a saw blade having improved means comprising a first advanced portion for lateral locking of the tool by a swinging motion of the tool, a second rear guide portion for the swinging motion and for securing the blade against longitudinal movement, and a third rear portion for locking the saw against releasing swinging movement by a resilient tongue action afforded by the second portion.

More broadly stated, my blade includes a closed ended slot for swinging blade attachment to a T-head, and a lateral resilient end tongue to facilitate anti-swinging engagement with a fixed abutment that desirably also affords a second point of lateral securement of the blade.

A further object of the invention is the provision of devices of the nature set forth having few and simple parts, and which are inexpensive to manufacture, convenient in use and operative in a simple manner without demonstration, and which are durable, reliable and efficient in operation.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a plan view, with a part removed, showing a device embodying the invention.

Fig. 2 is a fragmentary plan view of the detached tool or blade.

Figs. 3, 4, 5 and 6 are sectional views taken on the respective lines 3—3, 4—4, 5—5, and 6—6 of Fig. 1.

Fig. 7 is a sectional view similar to Fig. 3, but showing the tongue part of the blade resiliently deflected for releasing movement.

Fig. 8 is a fragmentary edge view of the handle with the blade differently applied thereto.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a tool handle 11 and a tool such as a blade or saw 12 applied thereto. As shown in Fig. 2, the blade may have a cutting edge such as saw teeth 13. Formed at an end portion of the saw is a first, advance securing portion 14, such as a generally central longitudinally extending closed ended slot. Rearward of the latter is a second portion 15 which serves to secure the blade against longitudinal movement, and may consist of a transverse slot open ended at either edge of the blade, preferably at the cutting edge 13. At or adjacent to the rear end of the blade is any opening 16, such as a notch or open slot or the like, adapted to receive a fixed part to thus prevent releasing swinging movement of the blade, all as hereinafter in detail described.

The various openings 14, 15 and 16 are co-ordinated to produce a novel blade wherein the open ended slot 15 serves as a guide for fixing the longitudinal position of the blade as the same is swung about the closed ended slot 14 which serves for lateral securement of the blade. At the same time, the open ended slot 15 cooperates with the notch 16 to form therebetween a resilient tongue 17 which is laterally deformable to serve as a cam like part or finger piece actuator for facilitating engagement and disengagement at said notch. As later described, the edges of the notch 16 may constitute an important means for laterally securing the blade to supplement the action at 14 so as to prevent lateral deflection due to the thinness of the blade. All the structure of the securing portions 14, 15 and 16 may be afforded in a single, thin plate or blade, and this represents an advantage of the invention.

The handle 11 may comprise a shank 18 which is preferably skeletonized so as to afford a top bar 19, a bottom bar 20a, and transverse interconnecting bars 20, 21. The bar or end portion 21 desirably affords an arcuate seat 22 which extends crosswise of the shank. A similar blade seat may be formed on the bar 20, though the latter may be plane as shown. Integrally connected to the bar 21 is a T-headed pin 23, whose head extends crosswise of the shank. The underside of the T-head is desirably inclined or cam shaped, so that after the head is passed through the blade slot 14, the blade may be given a quarter turn to bring it into the position of Fig. 1, with the T-head riding over the blade to transversely deflect the latter to snugly clampingly engage the seat 22, as shown in Fig. 5.

The bar 20 may have a lateral pin 24 adapted for engagement in the blade slot 15 in course of the swinging movement of the blade aforementioned. When so engaged, the pin 24 coacts with the slot 15 to cause the stem of the T-headed pin 23 to seat at the forward end of the slot 14, so that pin 23 may take the rearward thrust on the blade and laterally securely holds the blade as closely to the working part thereof as possible.

At the rear end of the shank 18 is a locking cam or projection 25 which extends into the free space or opening or recess 26 formed in the handle rearward of the shank bar 20. The said lock cam projects forward in the direction of the length of the shank 18 and is disposed on the same side thereof as the elements 23, 24 and in alinement with the latter. Said cam may be formed with one or more inclined opposite cam faces 27 along the sides thereof, and further, the projection 25 may be wedge shaped if desired. Preferably one of said faces 27a is perpendicular to act solely as a stop. Desirably the under side 28 of the member 25 may lie somewhat within the opening or free space 26. As thus shaped and arranged, the cam lock member 25 is adapted to spring into the blade notch 16, since forcible swinging of the blade 12 will cause the rounded end 29 of the blade to be guided under the cam lock by the action of the adjacent cam face 27. By causing the cam lock 25 to snugly fit the blade notch 16, the transverse wedge shape of the cam lock, as exemplified by the cam face 27, will laterally secure the blade against the handle shank, since the cam lock is thus too large to pass through the notch 16. An important advantage results because the resilient blade is thus laterally held at two spaced points, namely, at 23 and 25, to avoid excessive side spring and breakage.

The blade tongue 17 cooperates with the handle opening 26 to permit unobstructed lateral deformation of the tongue. For this reason the space 26 is amply large to receive the free end of the tongue 17. Hence the bar 20 may be forwardly curved as shown. Desirably the bottom bar 20a may have a recess at 30 adjacent to the opening 26 to afford additional operating space. Thus the operator may release the blade 12 by pressing with his thumb on the finger piece tongue 17, the recess 30 affording all necessary clearance for this purpose, and the tongue part 17 being thus resiliently deformed into the space 26, as shown in Fig. 7 so that the blade may be swung for releasing the same, with the cam lock 25 leaving the notch 16. It will be appreciated that the spacing between the elements 20 and 25 may be such as to afford a desired length of intervening blade for a required lesser or greater resilience.

It will now be seen that the cam lock 25 prevents accidental movement of the blade 12, and hence avoids buckling with its consequent danger to the hand and resultant loss of time and labor.

In order to permit cutting operations to be conveniently performed in corners, at angles, and the like, the blade 12 may also be secured to an edge of the handle shank 18, as shown in Fig. 8. This arrangement will also serve to illustrate a modified form of the invention. In general, the elements 23a, 24a and 25a are exact duplicates of the corresponding elements 23, 24 and 25 and are similarly arranged, and function in the same manner. However, the bar 19 which carries these elements is preferably recessed or formed with an opening, or downwardly inclined as at 31 toward the element 25a for the flexing of the blade tongue 17 according to the operation hereinbefore described in engaging the lock member 25 with the blade, and in releasing the latter. Because the blade tongue projects laterally of the shank, there is freedom for downwardly deflecting said tongue by finger pressure to release the blade.

It will now be apparent that the elements such as 23, 24 cooperate to prevent longitudinal movement of the blade relative to the handle, with the element 23 clamping the blade as close as possible to its working part. In cooperating with these elements, the element 25 serves to prevent any accidental lateral or swinging releasing movement of the blade so as to avoid buckling of the device. The blade is thus rigidly held in every direction. It may be noted that the element 25 may bear against the closed end of the notch 16 to afford a support against longitudinal thrust, supplemental to or as a substitute for that of the pin 24. In this regard the element 23 may be arranged to be disposed at either end of the slot 14. In any event, the slot 15 is desirable to provide the resilient tongue 17.

I have accordingly also provided a novel blade having a closed ended T-head attaching pivot slot, and a lateral end tongue for controlling an abutment engaging opening of the blade to prevent accidental releasing pivotal movement of the blade and preferably to afford a secondary point of lateral securement for the blade.

It will be noted that the pin 24 may form part of a means which includes the face 27a for preventing accidental angular movement of the blade in either direction.

I claim:

1. A device including a handle, a resilient blade, the handle having a T-headed pin, the blade having a slot for the latter whereby the blade is laterally secured to the handle by pivotal movement of the blade about the stem of said pin, the handle having means comprising a cam portion and a projecting stop portion, the blade having an opening for laterally receiving the stop portion to prevent accidental releasing pivotal movement of the blade, the cam portion coacting with a portion of the blade upon pivotal attaching movement thereof to resiliently deflect the blade to cause the stop portion to be received and secured in said opening, one of said portions having a part overlying the blade to laterally hold the blade against the handle.

2. A device including a handle, a resilient blade, the handle having a T-headed pin, the blade having a slot for the latter whereby the blade is laterally secured to the handle by pivotal movement of the blade about the stem of said pin, the handle having means comprising a cam portion and a projecting stop portion, the blade having an opening for laterally receiving the stop portion to prevent accidental releasing pivotal movement of the blade, the latter having a transverse open ended slot intermediate of said closed ended slot and said opening to afford a resilient tongue, the cam portion coacting with said tongue to resiliently deflect the same upon pivotal attaching movement of the blade to thus cause the stop portion to be received and secured in said opening, one of said portions having a part laterally overlying the blade to thus hold the same securely against the handle at a point longitudinally spaced from said T-headed pin.

3. A device including a handle for a resilient blade, comprising a shank having blade securing elements at one side thereof, said side forming a blade seat, one of said elements being a T-headed pin at an end of the shank, a second element being a finger spaced from the first element and projecting toward the latter, the shank having a recess below said finger, and the finger being disposed partially in said recess so that the underside of the finger lies below the blade seat, and one side of the finger forming a cam whereby a blade pivoting around the stem of said pin is deflected by said cam downwardly under the finger and into said recess, and the opposite side of the finger having a relatively perpendicular non-camming face.

4. A device according to claim 3, wherein a third element is in the nature of a pin disposed intermediate of the first and second elements and adapted to act as a stop for the pivotal movement of the blade.

5. A device including a handle having a seat, a resilient blade adapted to be positioned on said seat, the handle having a T-headed pin, the blade having a slot for the latter whereby the blade is secured to the handle by pivotal movement of the blade about the stem of the pin, the blade having an end opening spaced from the slot, and the handle having means for engaging said blade, at said opening by lateral deflection of the blade toward said handle below the plane of the seat, said means including a stop portion adapted to snap into said opening, and said means affording a recess below the stop portion and the plane of the seat so that the blade can be deflected and pivotally moved into said recess to engage the stop portion upon release of the lateral deflecting pressure on the blade.

6. A device including a handle having a seat, a resilient blade adapted to be positioned on said seat, the handle having a T-headed pin, the blade having a slot for the latter whereby the blade is secured to the handle by pivotal movement of the blade about the stem of the pin, the blade having an end opening spaced from the slot, and the handle having means for engaging said blade at said opening by lateral deflection of the blade toward said handle below the plane of the seat, said means including a stop portion adapted to snap into said opening, and said means affording a recess below the stop portion and the plane of the seat so that the blade can be deflected and pivotally moved into said recess to engage the stop portion upon release of the lateral deflecting pressure on the blade, the blade having a transverse open ended slot intermediate of the first named slot and said opening to provide a tongue to facilitate said deflection of the blade at said opening.

7. A device according to claim 5, wherein said stop portion is provided with a cam face to cause the deformation of the blade toward the handle upon engaging the stop portion in said opening.

8. A device including a handle having a seat, a resilient blade adapted to be positioned on said seat, the handle having a T-headed pin, the blade having a slot for the latter whereby the blade is secured to the handle by pivotal movement of the blade about the stem of the pin, the blade having an end opening spaced from the slot, and the handle having means for engaging said balde, at said opening by lateral deflection of the blade toward said handle below the plane of the seat, said means including a stop portion adapted to snap into said opening, and said means affording a recess below the stop portion and the plane of the seat so that the blade can be deflected and pivotally moved into said recess to engage the stop portion upon release of the lateral deflecting pressure on the blade, said stop portion having a part adapted to overlie the blade to prevent movement of the adjacent part of the blade away from the handle.

JOHN E. DAVEY.